United States Patent [19]
Herrera

[11] Patent Number: 5,576,033
[45] Date of Patent: Nov. 19, 1996

[54] MASA REWORK ASSIST SYSTEM

[75] Inventor: Michael L. Herrera, Pomona, Calif.

[73] Assignee: Casa Herrera, Inc., Los Angeles, Calif.

[21] Appl. No.: 390,526

[22] Filed: Feb. 17, 1995

[51] Int. Cl.⁶ ............................. A21C 3/02; A21C 11/10
[52] U.S. Cl. ..................... 425/217; 425/310; 425/363
[58] Field of Search ................................. 425/215, 217, 425/294, 310, 316, 363, 373

[56] References Cited

U.S. PATENT DOCUMENTS

| | | | |
|---|---|---|---|
| 1,732,567 | 10/1929 | Pereyra | 425/217 |
| 1,958,808 | 5/1934 | Zehender | 425/215 |
| 1,963,005 | 6/1934 | Wagner et al. | 425/215 |
| 2,062,215 | 11/1936 | Dubus | 425/215 |
| 4,966,541 | 10/1990 | Mistretta | 425/229 |
| 5,180,593 | 1/1993 | Mistretta et al. | 425/202 |
| 5,240,731 | 8/1993 | Bornhorst et al. | 426/549 |
| 5,306,133 | 4/1994 | Dayley | 425/217 |

FOREIGN PATENT DOCUMENTS 49-26703  7/1974  Japan ..................... 425/215

OTHER PUBLICATIONS

Casa Herrera, Inc. flyer entitled "Magna 254 Sheeting Head" (Date Unknown).

"Corn Tortilla And Flour Tortilla Production Equipment", 1986 by Donald B. Clark, P. E., Technical Services Director, given before the Technology of Flour and Corn Tortillas Seminar of the American Institute of Baking, Manhattan, Kansas, Aug. 31—Sep. 2, 1987.

*Primary Examiner*—James P. Mackey
*Attorney, Agent, or Firm*—Price, Gess, Ubell

[57] ABSTRACT

A rework assist belt system for use on a sheeting head used to form masa dough into thin sheets improves the final product by preventing contamination with fragments of rework dough. The rework assist belt system prevents rework from prematurely detaching from the front roller by moving in synchrony with the front roller so that the rework is held between the belt and the front roller. The rework is carried to the top of the front roller where it is disgorged into a dough hopper and mixed with other dough therein.

18 Claims, 4 Drawing Sheets

MASA REWORK ASSIST SYSTEM

BACKGROUND OF THE INVENTION

1. Field of the Invention

The present invention relates generally to food processing machinery and to devices for forming dough into tortilla or snack chips and, more specifically, to a device for preventing fragments of "rework" dough (also called scrap or lacing) from contaminating the final product.

2. Description of Related Art

A surprisingly small number of plant species provide the bulk of our food supply. Of chief importance are the cereal grains of which maize (corn) stands as the major New World grain. The great Amerindian civilizations of Central and South America thrived on maize and developed unique methods to consume it. Because corn kernels lack the elastic gluten proteins found in wheat, corn flour cannot be used to produce a leavened loaf. At the same time, dried maize cannot be readily steamed into a palatable staple like rice.

Therefore, the native Americans developed a technique in which they cooked dried maize with lime or other alkali and then ground the kernels to produce a sticky dough known as masa. Traditionally this dough was shaped by hand and baked on a griddle to make tortillas—the native bread of the New World and a central item in traditional Mexican cuisine.

The popularity of tortillas and other comestibles made from corn has continued to increase. Today, special machines called sheeting heads are used to form the masa dough into relatively thin sheets from which tortillas and other food products, such as chips, are cut. The typical sheeting head comprises a pair of parallel counterrotating rollers, a front roller, and a rear roller, rotating on a horizontal axis.

Masa dough is loaded into the top of the sheeting head, and it is drawn or pinched between the rollers thereby being formed into a thin sheet. Because the dough is sticky, it must be physically stripped from the rollers to release the dough sheet.

In many prior art sheeting heads, the stripping is accomplished by a stripper wire in contact with a lower surface of the rear roller. As the dough is extruded between the rollers, the wire peels the dough from the rear roller, leaving the dough sheet adhering only to the front roller.

After the dough has been removed from the rear roller and left on the front roller, rotation of the front roller carries the sheet of dough into contact with a rotary cutter which counterrotates in contact with the front roller. A series of raised ridges on the cutter cut tortillas, chips, or other products from the dough sheet.

Although cut, the dough still adheres to the front roller. As the dough is moved along by the rotation of the front roller, it comes into contact with a front stripper wire which interrupts the contact between the cut dough and the front roller. As the cut dough is stripped from the roller, it falls onto a moving conveyor belt which carries it into an oven or frier for cooking.

The remainder of the dough sheet that surrounds the cut product on the front roller is called "rework" or scrap. This dough is recycled into the hopper to be mixed with fresh dough and re-extruded. Frequently the front sheeting head roller is equipped with a system of grooves holding strip-like bands. The bands serve to retains edges of the rework so that the front roller can carry the rework up and back into the hopper for recycling. The bands are spaced apart, forming lanes on the roller. Depending on the size of the cut product, a given roller may have a greater or lesser number of bands. A particular product pattern requires a particular band layout so as to optimize retention of the rework on the roller.

Stripper wires have long been a source of problems because they wear and may break, necessitating the shutting down of the whole production line. A number of different improvements have been devised to reduce stripper wire breakage and to eliminate some problems with stripper wires. Recently, workers have discovered that a speed differential between the two rollers can cause the dough sheet to transfer completely from the rear roller to the front roller without the use of a stripper wire. If the front roller is operated at a speed of about 1.1 to 3.0 times that of the rear roller, effective transfer of the dough sheet to the front roller can occur without the intervention of a stripper wire. The exact speed differential for optimal transfer depends on the particular consistency of the dough. For many masa products a ratio of about 1.5 between the front and rear rollers seems effective. This improvement reduces the number of stripper wires per sheeting head to one; the front stripper wire or some other stripping device such as doctor blades or focused air streams is still needed to remove the cut product from the front roller.

However, certain problems have become apparent with the differential roller speed system. Generally the greater the differential in speed between the two rollers, the more complete the transfer of the dough sheet to the front roller. This can be critical, since many dough mixtures used to make corn chips and similar products contain rather coarse particles of ground maize. While this did not pose a problem with the older stripper wire system, with the differential speed method it is possible to have partial transfer where some coarse particles fail to transfer properly and remain on the rear roller. This results in a dough sheet on the front roller with "pinholes" where a particle of maize has been pulled out of the sheet and remains attached to the rear roller. These pinholes are visible as cosmetic defects in the finished food product.

Various experiments have been undertaken to cure the pinhole problem. Surface texture of the rollers may have some effect on dough adhesion. Thus, attempts have been made to polish the rear roller in hopes of decreasing the dough's adherence thereto. Thus far this approach has not solved the problem. The most effective way of avoiding pinholes seems to be increasing the speed differential between the rollers. Unfortunately, this tends to create another problem. Paradoxically, although an increase of the speed of the front roller may assure more complete transfer of the dough sheet to the front roller, this same speed increase may also decrease the adherence of the rework to the front roller. This results in fragments of rework peeling off the front roller and falling onto the cut product on the conveyor belt. Thus, one is forced to choose between the cosmetic defects of pinholes in the product and the cosmetic defects of rework fragments in the final product. Furthermore, this problem is sensitive to the exact consistency of the dough. Therefore, a speed differential may work well with one batch of dough and result in rework or pinhole problems with a slightly different dough of a second batch.

OBJECTS AND SUMMARY OF THE INVENTION

It is an object of the present invention to provide an improved sheeting head that operates on the speed differential principle but is not plagued by problems with pinholes in the dough sheet or with rework dropping from the front roller onto the cut product;

It is a further object of the present invention to provide a system to reduce or eliminate rework problems in sheeting heads of almost any configuration; and It is another object of the present invention to provide a sheeting head with a reduced and constant number of bands so that one sheeting head can be used with cutters of several different product configurations.

These and other objects are met by a sheeting head that provides a sufficient speed differential between a front and a rear roller to ensure that a dough sheet transfer completely to the front roller. Rework is prevented from prematurely detaching from the front roller by a rework assist belt that moves in synchrony with the roller so that the rework is held between the belt and the roller until the rework reaches the top of the roller, where it is recycled into a dough hopper, and mixes with other dough therein.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 4 shows a cross-section through one of the bands of FIG. 3a;

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a rework assist belt to prevent contamination of cut product by rework fragments.

Figure 1:
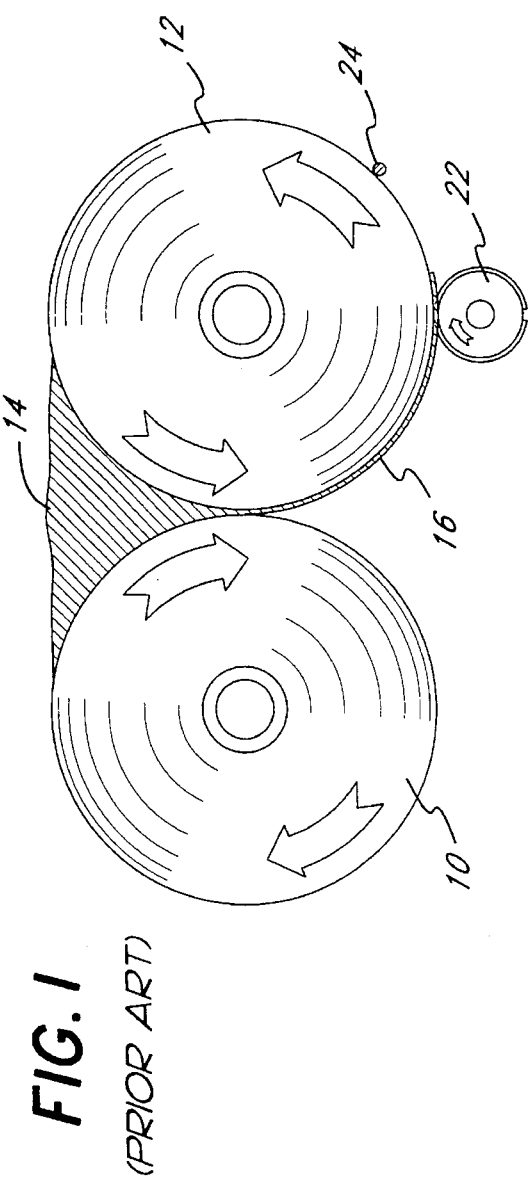
FIG. 1 is a diagram of a cross-section of a front and a rear roller of a differential speed sheeting head.

FIG. 1 shows a diagrammatic cross-section through rollers of a differential speed sheeting head to illustrate its basic operation. A rear roller 10 and a front roller 12 are horizontally disposed, counterrotating parallel to each other. A space between the rollers 10, 12 constitutes a hopper which is filled with masa dough 14. The dough 14 is retained on two sides by the rollers 10, 12 and on the two remaining sides by end walls (not shown). The front roller 12 and the rear roller 10 counterrotate, as shown by the arrows in the figure. This rotation draws the dough 14 downward to be pinched into a dough sheet 16 by the rollers 10, 12. A separation distance between the rollers determines the thickness of a dough sheet 16 formed and is adjustable so that dough sheets 16 of different thicknesses can be produced, allowing one sheeting head to manufacture a variety of products ranging from corn chips to tortillas.

A point of minimum dough thickness is reached where the rollers 10, 12 come the closest together. Below that point the rollers 10, 12 separate and the dough sheet 16 is pulled in opposite directions by the rotating rollers 10, 12. However, the front roller 12 is driven at a higher rate of revolution than is the rear roller 10. Normally the speed differential between the two rollers is between about 1.1 and 2.0. In practice, the speed of the front roller 12 is constant, while the rear roller 10 is slowed down relative to the front roller 12 to achieve the desired differential.

The mechanism of dough sheet 16 transfer to the more rapidly-moving roller is not intuitively obvious. The dough near the faster-moving roller is traveling faster than the dough near the slower-moving roller. The fast-moving and slow-moving dough masses tend to be pulled apart. If the dough has an appreciable cohesive strength (dough-to-dough contact strength), the weakest point would be the dough-to-roller contact. Thus, the faster-moving dough would "rip" the dough sheet 16 off the slower-moving roller. If the speed differential is not large enough, the dough will "creep," and the separation may occur within the dough rather than between the dough and the slower roller. This within dough separation is a possible explanation for dough sheets 16 with pinholes.

Figure 3:
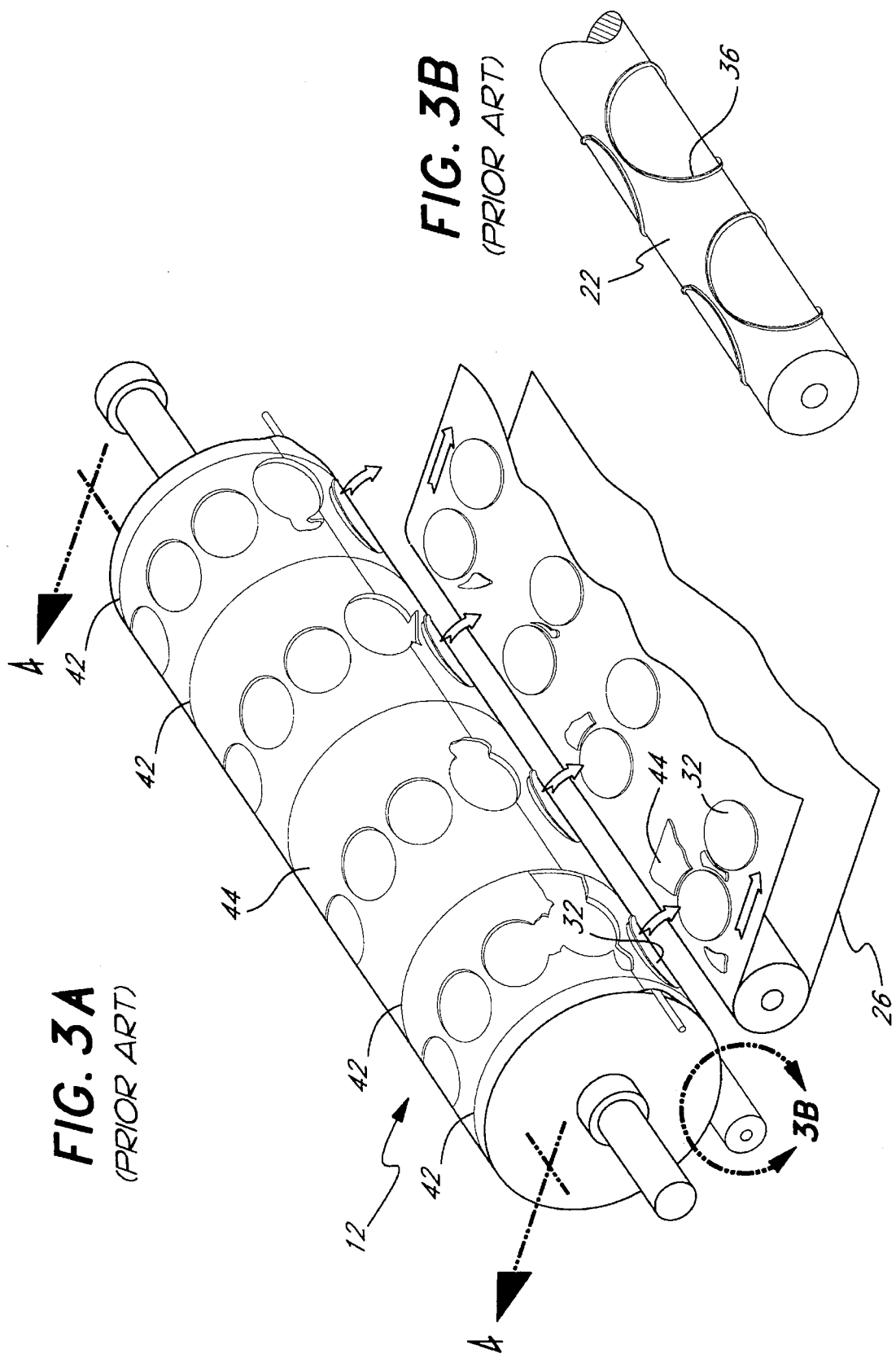
FIG. 3A shows a perspective view of a sheet of dough with tortillas cut into the sheet.
FIG. 3B shows a perspective view of a cutter roller.
Figure 4:
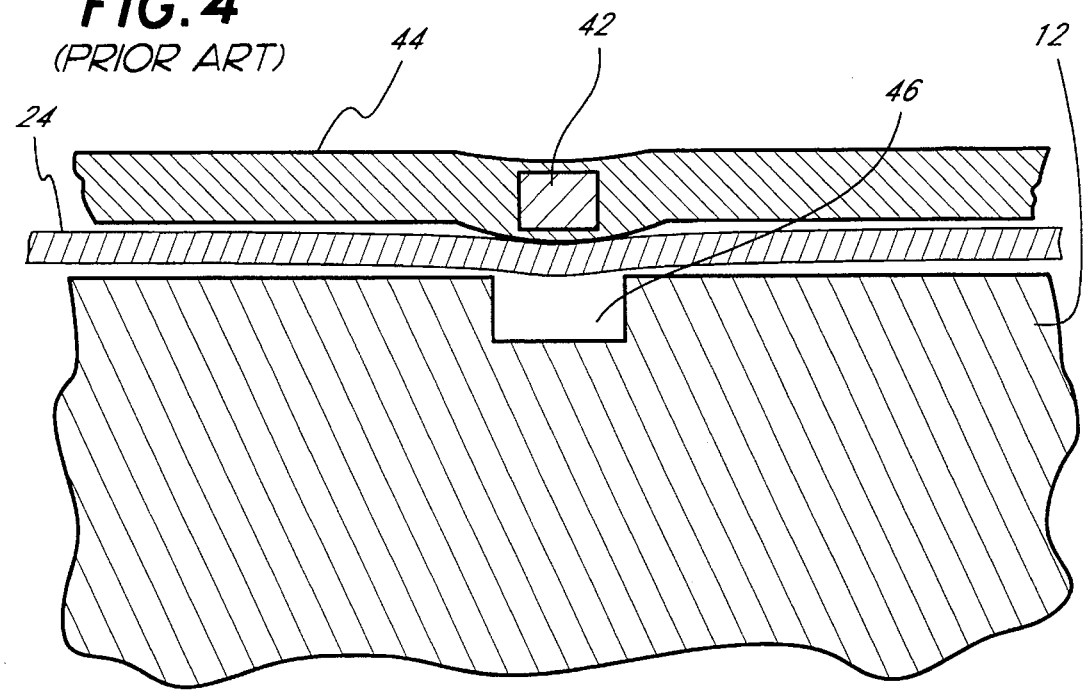

Whatever the explanation of the dough transfer to the front roller 12, the transferred dough sheet 16 soon rotates into contact with a rotary cutter 22 (see FIG. 3B). The rotary cutter 22 cuts out tortillas or chips from the dough sheet 16. FIG. 3A shows a possible layout of round tortillas 32 cut from the dough sheet 16. Dough around the cut tortillas 32 comprises rework dough 44. Normally the dough sheet 16 is pressed into tight contact with vertical roller divisions called bands 42 when the dough sheet 16 is formed between the two rollers (see FIGS. 3A and 4). Each band 42 lies in a groove 46 and serves to grip the rework so that when a stripper wire 24 in contact with the front roller 12 strips the cut tortilla 32 from the front roller 12, the rework dough 44 remains attached to the front roller because it is wound around the band 42 and the rework dough 44 is retained and not peeled from the front roller 12.

Figure 2:
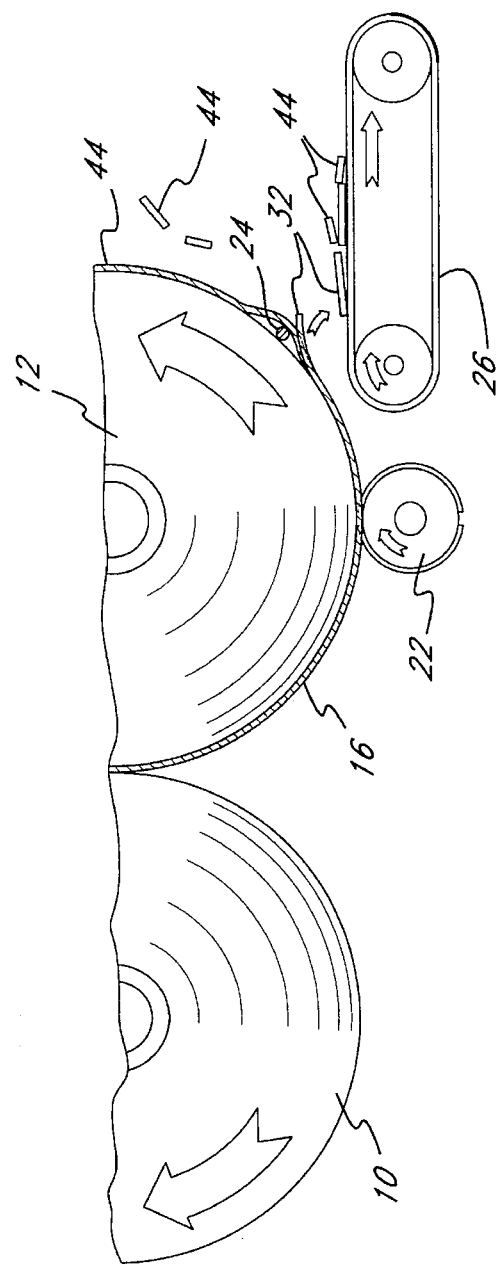
FIG. 2 shows a rotary cutter and front stripper wire of the sheeting head of FIG. 1.

The front roller 12 then carries the rework dough 44 over the top of the front roller 12 and back into the hopper, where it mixes with the mass of masa dough 14 for re-extrusion between the rollers 10, 12 (see FIG. 2). However, if the rework dough 44 is only weakly attached, it may detach from the front roller 12 just above the front stripper wire 24 and fall onto the cut tortillas 32 on the conveyor belt 26 (see FIGS. 2 and 3A). The present invention greatly reduces the problem of product contamination by the rework dough 44.

Figure 5:
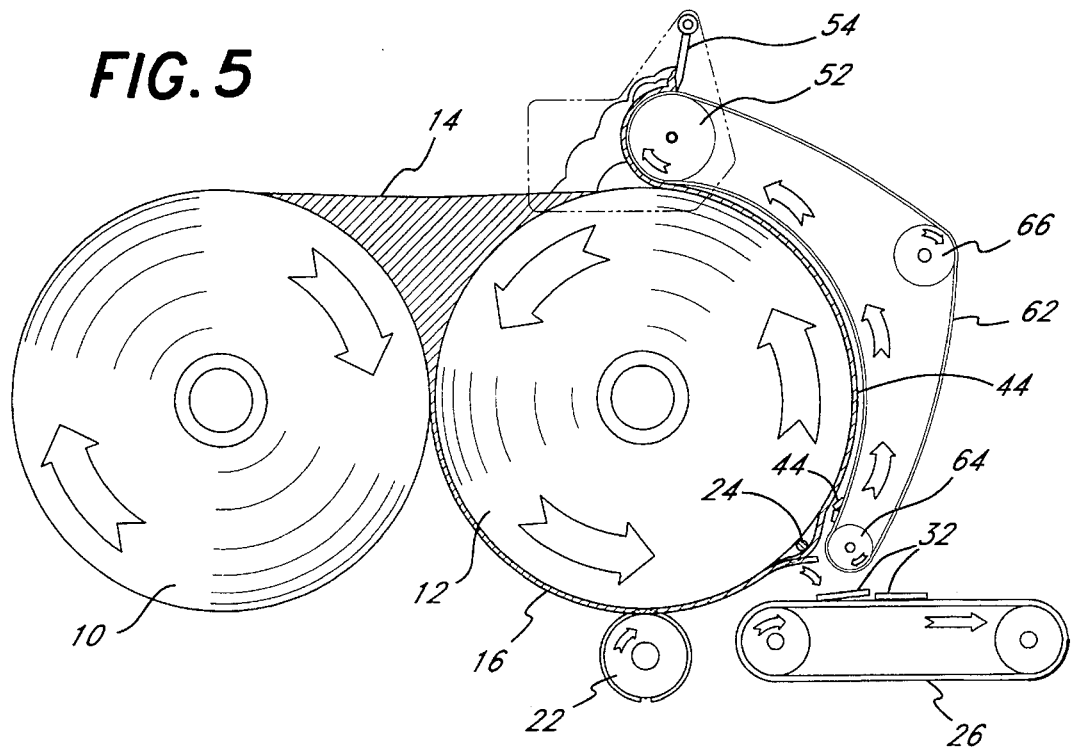
FIG. 5 shows a cross-section through a rework assist belt of the present invention.
Figure 6:
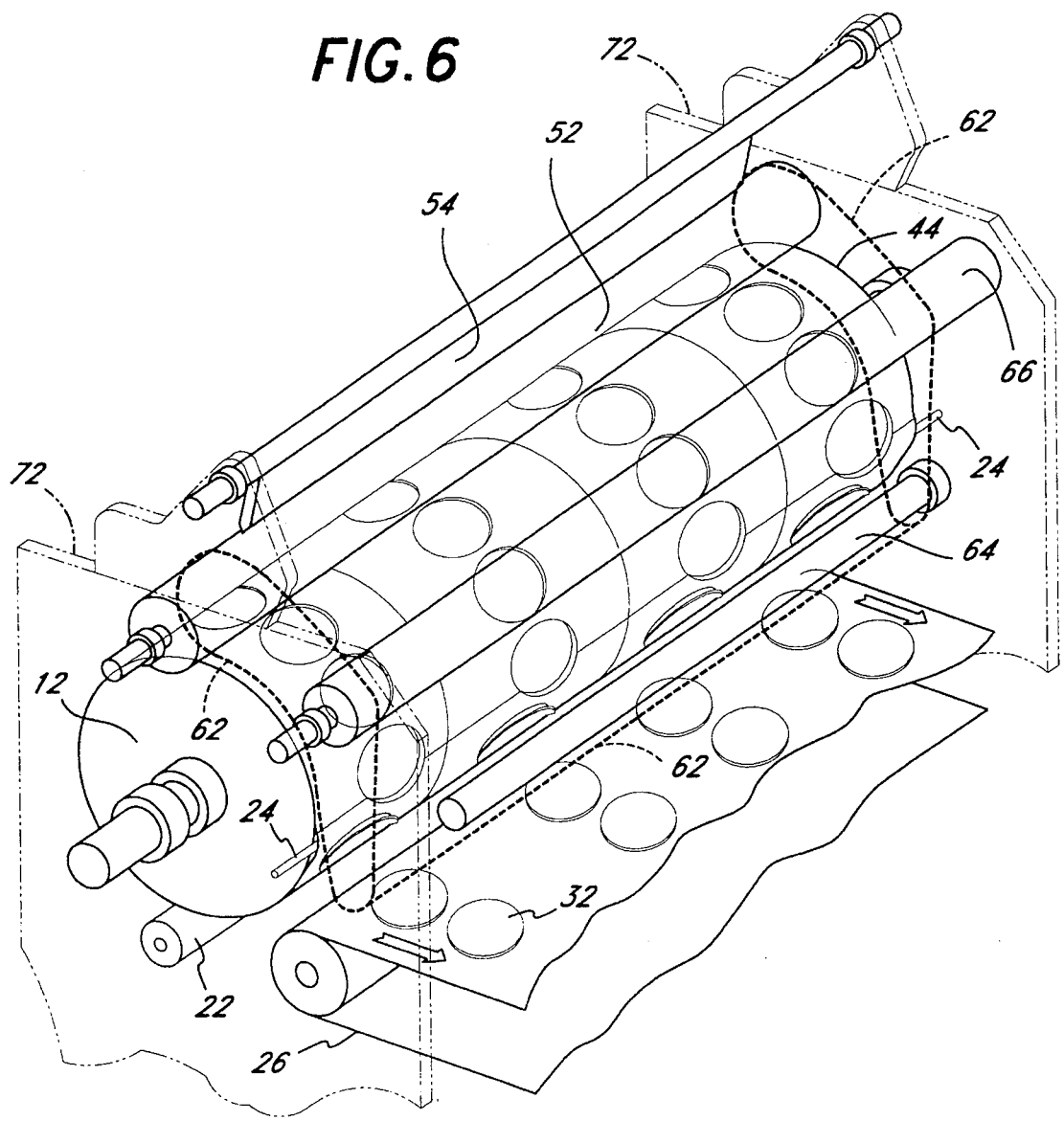
FIG. 6 shows a perspective view of a sheeting head equipped with the rework assist belt of the present invention.

As shown in FIGS. 5 and 6, a continuous rework assist belt 62 of flexible material with a width approximately equal to a width of the front roller 12 counterrotates in contact with the front roller 12. The rework assist belt 62 is oriented more or less vertically. A rework roller 52 passes through the belt at an upper end and serves to drive the rework assist belt 62 conveyor-like. At a lower end the belt passes around a locator shaft 64.

The exact position vertically and horizontally of the locator shaft 64 can be adjusted by moving its end bearings in a slot (not shown) in a frame 70. Preferably, the locator shaft 64 is positioned to almost contact the front roller 12 just above the front stripper wire 24. The locator shaft 64 and, hence, the rework assist belt 62, is spaced apart from the front roller 12 by a thickness of the dough sheet 16. A spring-loaded idler shaft 66 may also be provided to ensure that the rework assist belt remains taut in spite of adjustment of the locator shaft position.

The rework roller 52 counterrotates in synchrony with the front roller 12. Hence, the rework assist belt 62 of the present invention also moves in synchrony with the front roller 12. This synchrony may be achieved by driving the rework roller 52 by a chain and sprocket arrangement (not shown) or by a direct gear linkage (not shown) from the same motor that drives the front roller 12. Alternatively, an end edge of the front roller 12 can be incised forming gear teeth (not illustrated) which directly mesh with a suitable gear that is mounted coaxially with the rework roller 52. At the front stripper wire 24 the cut tortillas 32 are peeled from the front roller 12 and fall onto the product conveyor belt 26 to be transferred to additional processing stations. The rework dough 44 is partially retained by the bands 42 so that it is not peeled off the front roller 12. As soon as the rework dough 44 passes the stripper wire 24, it is captured between the rework assist belt 62 and the front roller 12 so that it cannot fall onto the product conveyor belt 26.

The rework dough 44 is carried between the rework assist belt 62 and the front roller 12 until it is returned to the dough mass 14 in the hopper. The rework assist belt 62 is preferably made with a Teflon™ or other nonstick surface. A rework scraper 54 that contacts the rework assist belt 62 as it runs over the rework roller 52 removes any dough that does adhere to the rework assist belt 62. Dough scraped from the rework assist belt 62 falls into the main dough mass 14 to be recycled.

Another advantage of the rework assist belt 62 is that by preventing the rework dough 44 from detaching from the sheeting head roller 12, the precise configuration of the bands 42 is less critical. As mentioned above, the number of bands 42 is normally closely linked to the particular product being cut. If a given roller is wide enough for eight lanes of product, there would be nine bands 42 so that each lane would be defined by two bands. If a different cutter produced 16 lanes of product, it can not be used on the nine band roller because the rework dough 44 would tend to fall onto the product because of an insufficient number of bands 42. However, the rework assist belt 62 limits this problem so that a roller configuration with a minimal number of bands can be used to produce product with various lane configurations.

The rework assist belt 62 has been described as having one active driving shaft (the rework roller 52) that causes the rework assist belt 62 to move and two shafts that are passively rotated by the belt. Obviously, the number of passive and active shafts and their positions can be varied to accommodate various sheeting head configurations. Likewise, slots or other devices to locate the shafts and adjust tautness of the rework assist belt 62 can also vary within the scope of the present invention.

Woven belts of fiberglass or various plastic fibers or even textile belts with a number of different surface coatings can be employed, as can extruded belts of various plastic compositions.

Although the illustrations of the present invention are shown with a two roller sheeting head, this is merely for the convenience of illustrating commonly used devices. The rework assist belt 62 is readily usable with sheeting head configurations different from those illustrated as long as retention of rework dough 44 on a roller is of concern.

Those skilled in the art will appreciate that various additional adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A rework assist belt system to ensure that pieces of rework dough do not mix with a product, the rework assist belt system comprising:

at least two shafts, the first shaft located near a top of a roller of a dough sheeting device and the second shaft located near a front stripping means, at least one of the shafts acting as a driving shaft with driving means for revolving the driving shaft in synchrony with the roller, the shafts parallel to said roller and further comprising adjustment means for repositioning the second shaft in relation to the front roller; and a belt member, formed as a closed-loop flexible belt, with said shafts drivingly in contact with an inner surface of the belt member so that the belt member travels endlessly around the shafts with an outer surface of the belt member in close proximity to a forward-facing region of the roller from a region near the front stripping means to a region near the top of the roller so as to assist the rework dough in traveling to the top of the roller.

2. The rework assist belt system of claim 1 further comprising scraper means near the top of the roller for scraping dough from the outer surface of the belt member.

3. The rework assist belt system of claim 2, wherein the scraper means comprises a blade pressing against the belt member passing over the first shaft.

4. The rework assist belt system of claim 1, wherein the stripping means comprises a stripper wire.

5. The rework assist belt system of claim 1, wherein the driving shaft is the first shaft.

6. The rework assist belt system of claim 1 further comprising at least one idler shaft disposed between the first shaft and the second shaft, the idler shaft repositionable to ensure that the belt member remains taut.

7. A rework assist belt system to ensure that pieces of rework dough do not mix with a product, the rework assist belt system comprising:

a sheeting head having counterrotating rollers, the sheeting head for forming dough from a hopper into a thin dough sheet in contact with a front roller thereof;

at least two shafts parallel to said front roller, the first shaft located near a top of the front roller of the sheeting head and the second shaft located near a front stripping means,
   one shaft acting as a driving shaft with driving means for revolving the driving shaft in synchrony with the front roller, the shafts further comprising
   adjustment means for repositioning the second shaft in relation to the front roller; and a belt member, formed as a closed-loop flexible belt, with the driving shaft drivingly in contact with an inner surface of the belt member so that the belt member travels endlessly around said shafts with an outer surface of the belt member in close proximity to a forward-facing region of the front roller from a region near the stripping means to a region near the top of the front roller.

8. The rework assist belt system of claim 7, further comprising scraper means for scraping dough from the outer surface of the belt member.

9. The rework assist belt system of claim 7, wherein the stripping means comprises a stripper wire.

10. The rework assist belt system of claim 7, wherein the driving shaft is the first shaft.

11. The rework assist belt system of claim 7 further comprising at least one idler shaft disposed between and parallel to the first shaft and the second shaft, the idler shaft repositionable to ensure that the belt member remains taut.

12. A rework assist belt system to ensure that pieces of rework dough do not mix with a product, the rework assist belt system comprising:

a driving shaft, located near a top of a front roller of a dough handling device and parallel to said roller, with driving means for revolving the driving shaft in synchrony with the front roller;

a locator shaft in proximity to a front stripping means of the dough handling device and parallel to said roller;

adjustment means for repositioning the locator shaft in relation to the front roller; and a belt member, formed as a closed-loop flexible belt, with the driving shaft and the locator shaft in contact with an inner surface of the belt member, the driving shaft driving the belt to travel endlessly around the shafts with an outer surface of the belt member in close proximity to a forward-facing region of the front roller from a region near the front stripping means to a region near the top of the front roller.

13. The rework assist belt system of claim 12 further comprising at least one idler shaft parallel to the driving shaft and the locator shaft, the idler shaft repositionable to ensure that the belt member remains taut.

14. The rework assist belt system of claim 12, further comprising a scraper blade, in contact with the belt member as the belt member passes over the driving shaft, for scraping dough from the outer surface of the belt member.

15. A rework assist belt system to ensure that pieces of rework dough do not mix with a product, the rework assist belt system comprising:

a sheeting head comprising counterrotating rollers, the sheeting head for forming dough from a hopper into a thin dough sheet in contact with a front roller of the sheeting head; and a rework assist belt comprising:

a driving shaft, located near a top of the front roller parallel to said roller, with driving means for revolving the driving shaft in synchrony with the front roller;

a locator shaft parallel to said roller and in proximity to a front stripping means of the sheeting head;

adjustment means for repositioning the locator shaft in relation to the front roller;

a belt member, formed as a closed-loop flexible belt, with the driving shaft and the locator shaft in contact with an inner surface of the belt member, the driving shaft driving the belt to travel endlessly around the shafts with an outer surface of the belt member in close proximity to a forward-facing region of the front roller from a region near the stripping means to a region near the top of the front roller;

an idler shaft parallel to the locator shaft and the driving shaft, positionally adjustable to keep the belt member taut; and a scraper blade, in contact with the belt member as the belt member passes over the driving shaft, for scraping dough from the outer surface of the belt member.

16. A rework assist belt system to ensure that pieces of rework dough do not mix with a product, the rework assist belt system comprising:

a driving shaft parallel to and located near a top of a roller of a dough sheeting machine with driving means for revolving the driving shaft in synchrony with the roller;

a second shaft parallel to the driving shaft and located near a dough stripping means associated with the roller;

adjustment means for repositioning the second shaft in relation to the roller; and a belt member, formed as a closed-loop flexible belt, with the shafts in operational contact with an inner surface of the belt member so that the driving shaft drives the belt member to travel endlessly around the shafts with an outer surface of the belt member in close proximity to a forward-facing region of the roller from a region near the dough stripping means to a region near the top of the roller so as to assist the rework dough in traveling to the top of the roller.

17. The rework assist belt system of claim 16 further comprising at least one idler shaft parallel to and disposed between the driving shaft and the second shaft, the idler shaft repositionable to ensure that the belt member remains taut.

18. The rework assist belt system of claim 16, further comprising a scraper blade, in contact with the belt member as the belt member passes over the driving shaft, for scraping dough from the outer surface of the belt member, the blade positioned so that the scraped dough enters a dough source of the dough sheeting machine.

* * * * *